INVENTORS
JAMES R. WEST
BY EDWARD H. CONROY

ATTORNEYS

INVENTORS
JAMES R. WEST
BY EDWARD H. CONROY
ATTORNEYS

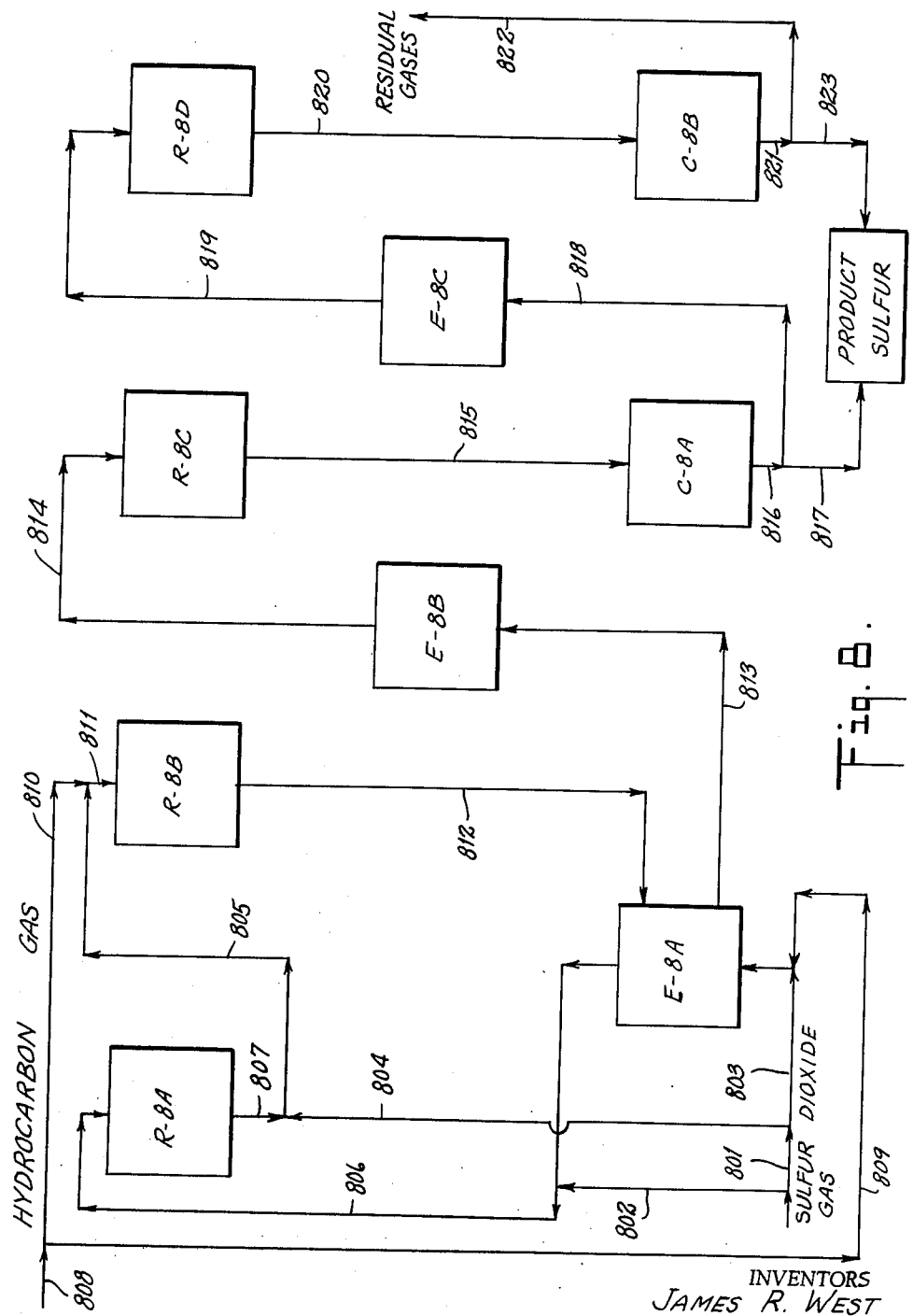

United States Patent Office 3,199,955
Patented Aug. 10, 1965

3,199,955
PROCESS OF REDUCING SULPHUR DIOXIDE
TO ELEMENTAL SULPHUR
James R. West, South Hempstead, N.Y., and Edward H. Conroy, New Gulf, Tex., assignors to Texas Gulf Sulphur Company, New York, N.Y., a corporation of Texas
Filed Aug. 20, 1962, Ser. No. 218,025
6 Claims. (Cl. 23—226)

This invention relates to a method of producing elemental sulphur from sulphur dioxide and from sulphur dioxide containing gases. It relates particularly to such a process in which hydrocarbons, generally normally gaseous hydrocarbons, are employed to effect a reduction of the sulphur dioxide.

Heretofore hydrocarbons have been used in treating sulphur dioxide and sulphur dioxide containing gases to produce elemental sulphur. The sulphur dioxide or sulphur dioxide containing gases have included those evolved in roasting, smelting and sintering sulphide ores or gases from power plants burning high sulphur coal or other industrial operations involving the combustion of sulphur bearing fuel such as fuel oil in refineries. Such gases have also come from the burning of sulphur ores.

Generally where hydrocarbons or gaseous hydrocarbons have been employed the reduction of the sulphur dioxide has been carried out at temperatures in excess of 1200° C. This has been necessary in order to effect complete reaction of the hydrocarbon reducing agent at an efficient rate.

It has been necessary to consume significant quantities of the hydrocarbon in order to maintain the temperature of reaction and at the temperatures involved much of the hydrocarbon is necessarily consumed in combination with oxygen present in the sulphur dioxide bearing gases.

Such gases have, for example, the following compositions:

| Component | Gas Composition (volume percent) | | | | |
|---|---|---|---|---|---|
| | A | B | C | D | E |
| Sulphur dioxide | 0.3 | 5 | 11 | 80 | 100 |
| Oxygen | 3.0 | 12 | 3.5 | 0 | 0 |
| Nitrogen | 80.7 | 83 | 85.5 | 20 | 0 |
| Carbon dioxide | 16.0 | 0 | 0 | 0 | 0 |

The prior processes are generally very inefficient. They have involved the use of high temperatures resulting in excessive consumption of the hydrocarbon. They have involved the use of large volumes of oxygen, air or oxygen containing gas to provide the necessary heat and have required large scale equipment. They have also tended to produce sulphur of low purity and poor color.

One of the objects of the present invention is to provide efficient practical recovery of elemental sulphur from sulphur dioxide gases ranging from pure or substantially pure sulphur dioxide to sulphur dioxide gases containing a very small percent of sulphur dioxide along with oxygen, nitrogen, carbon dioxide and other gases resulting from industrial operations.

Another object of this invention is to provide a process in which a catalyst is and may be used efficiently for converting sulphur dioxide to elemental sulphur utilizing hydrocarbons and specifically normally gaseous hydrocarbons.

Another object of this invention is to provide a process in which sulphur dioxide, either pure or in sulphur dioxide containing gases, is reacted with hydrocarbons, generally normally gaseous hydrocarbons, at temperatures lower than any heretofore considered practical with a resultant saving in the amount of hydrocarbons used and without the deterioration of the catalyst which would occur at the temperatures heretofore considered essential.

Another object of the invention is to react the sulphur dioxide with the hydrocarbons with a minimum of oxygen, air or oxygen containing gas formerly required in much larger volume to provide the heat to carry the reaction forward.

Another object is to provide a method of producing elemental sulphur from sulphur dioxide gases utilizing hydrocarbons in which the capital outlay for equipment is maintained at a minimum.

Another object is to provide a method of the type referred to above in which product sulphur of high purity and good color are obtained.

Other objects and advantages will be apparent from the following description of the invention and the method of carrying it out in which preferred methods of carrying out the invention are described by way of illustration. It will be appreciated that the method may be carried out by these methods and by variations thereof which utilize the same principles.

In the drawings FIG. 1 illustrates diagrammatically equipment for carrying out the invention.

FIG. 8 is a diagrammatic representation of another form of apparatus for carrying out the invention.

Figure 1:
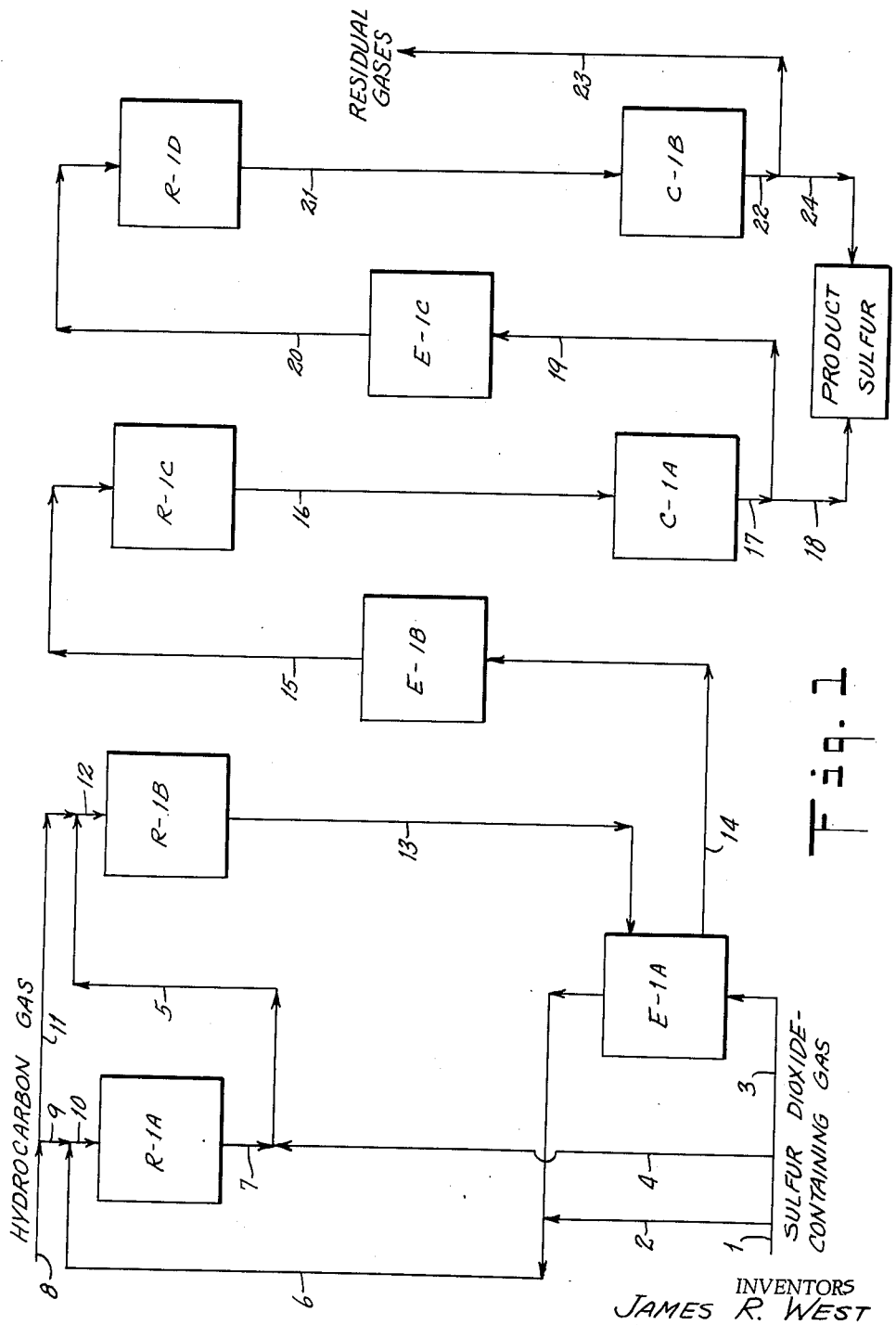

In carrying out the invention the sulphur dioxide and a hydrocarbon, preferably a normally gaseous hydrocarbon such as methane or natural gas, are reacted in the presence of a suitable catalyst at a temperature well below the temperatures heretofore employed in reducing sulphur dioxide with a hydrocarbon. A relatively complete reaction between the sulphur dioxide and the hydrocarbon reducing agent is thus effected and there is a significant saving in fuel.

The reaction between a normally gaseous hydrocarbon and sulphur dioxide may be effected with an alumina catalyst at a temperature as low as 750° C. and such a catalyst, or even more active catalysts, may initiate and maintain the reaction at temperatures below 750° C.

In the preferred form of the invention the reaction is carried out while maintaining the temperature below 1000° C. and generally in the range of from 800 to 1000° C. In general the reaction itself is exothermic and steps may be taken to assure that the temperature remains below 1000° C. as pointed out below.

The sulphur dioxide or sulphur dioxide containing gases are available generally at varying temperatures depending upon previous treatment. In some cases the gases may be at ambient temperatures, as is the case when they have been washed with water. And it may be necessary in such cases to pre-heat the sulphur dioxide or sulphur dioxide bearing gas to a temperature sufficient to initiate and maintain the reaction with the hydrocarbon. The normally gaseous hydrocarbons may also be pre-heated. Such pre-heating may be accomplished by various generally known economical engineering practices.

The catalyst may be selected from a large group of catalysts. Activated alumina is highly desirable and highly satisfactory results have been obtained using bauxite, calcium sulphide and quartz.

The process is carried out in three stages or steps. In the first stage the catalytic reduction of the sulphur dioxide with the hydrocarbon, preferably normally gaseous hydrocarbon, will produce a gas containing the following sulphur bearing components: (1) sulphur vapor; (2) hydrogen sulphide; (3) carbonyl sulphide; (4) carbon disulphide, and (5) sulphur dioxide.

The main reaction which occurs at this stage is:

$$SO_2 \text{ (gas)} + \text{hydrocarbon gas} = H_2S \text{ (gas)} + S \text{ (gas)} + CO_2 \text{ (gas)} + H_2O \text{ (gas)}$$

When the invention is carried out as indicated above the gas remaining in addition to the sulphur consists of the above named constituents and sulphur dioxide and the mol ratio of sulphur compounds other than sulphur dioxide to sulphur dioxide is preferably 2:1.

The reaction which takes place in the first stage is complex and yields a variety of products. When methane is used, for example, some or all of the following reactions may occur depending on the conditions. In these reactions the product sulphur for purposes of stoichiometry is shown in these equations as monoatomic sulphur vapor although it will exist as a complex mixture of octatomic, hexatomic, quadratomic, diatomic and monatomic molecules. The exact composition will depend on the temperatures and pressures.

(1) $CH_4 \text{ (gas)} + 2SO_2 \text{ (gas)} = 2S \text{ (gas)} + 2H_2O \text{ (gas)} + CO_2 \text{ (gas)}$
(2) $2CH_4 \text{ (gas)} + 3SO_2 \text{ (gas)} = 2COS \text{ (gas)} + S \text{ (gas)} + 4H_2O \text{ (gas)}$
(3) $2CH_4 \text{ (gas)} + 3SO_2 \text{ (gas)} = 2H_2S \text{ (gas)} + 2CO_2 \text{ (gas)} + 2H_2O \text{ (gas)} + S \text{ (gas)}$
(4) $2CH_4 \text{ (gas)} + 3SO_2 \text{ (gas)} = CS_2 \text{ (gas)} + CO_2 \text{ (gas)} + 4H_2O \text{ (gas)} + S \text{ (gas)}$
(5) $CH_4 \text{ (gas)} + SO_2 \text{ (gas)} = CO \text{ (gas)} + H_2O \text{ (gas)} + H_2S \text{ (gas)}$
(6) $CH_4 \text{ (gas)} + 4S \text{ (gas)} = CS_2 \text{ (gas)} + 2H_2S \text{ (gas)}$
(7) $2CO \text{ (gas)} + SO_2 \text{ (gas)} = 2CO_2 \text{ (gas)} + S \text{ (gas)}$
(8) $2H_2O \text{ (gas)} + 3S \text{ (gas)} = 2H_2S \text{ (gas)} + SO_2 \text{ (gas)}$
(9) $CO_2 \text{ (gas)} + H_2S \text{ (gas)} = COS \text{ (gas)} + H_2O \text{ (gas)}$
(10) $2COS \text{ (gas)} = CS_2 \text{ (gas)} + CO_2 \text{ (gas)}$
(11) $CH_4 \text{ (gas)} + 3CO_2 \text{ (gas)} = 4CO \text{ (gas)} + 2H_2O \text{ (gas)}$
(12) $2CS_2 \text{ (gas)} + 2SO_2 \text{ (gas)} = 6S \text{ (gas)} + 2CO_2 \text{ (gas)}$
(13) $H_2O \text{ (gas)} + COS \text{ (gas)} = H_2S \text{ (gas)} + CO_2 \text{ (gas)}$
(14) $2H_2O \text{ (gas)} + CS_2 \text{ (gas)} = 2H_2S \text{ (gas)} + CO_2 \text{ (gas)}$
(15) $CH_4 \text{ (gas)} + 2H_2O \text{ (gas)} = 4H_2 \text{ (gas)} + CO_2 \text{ (gas)}$
(16) $CH_4 \text{ (gas)} + H_2O \text{ (gas)} = CO \text{ (gas)} + 3H_2 \text{ (gas)}$
(17) $CO \text{ (gas)} + H_2O \text{ (gas)} = CO_2 \text{ (gas)} + H_2 \text{ (gas)}$
(18) $3H_2 \text{ (gas)} + SO_2 \text{ (gas)} = H_2S \text{ (gas)} + 2H_2O \text{ (gas)}$
(19) $H_2 \text{ (gas)} + S \text{ (gas)} = H_2S \text{ (gas)}$
(20) $CO \text{ (gas)} + S \text{ (gas)} = COS \text{ (gas)}$ As indicated above these reactions in the presence of the catalyst will take place at an appreciable rate at temperatures as low as 750° C. When normally gaseous hydrocarbons of higher molecular weight than methane are employed they may start at a lower temperature in this stage of the process.

In the preferred form of the invention the temperature range in the first stage is from 800 to 1000° C. At this temperature between 40 and 60% of the inlet sulphur dioxide will appear in the production gases from the first step as elemental gaseous sulphur. The remainder will be found as hydrogen sulphide, carbonyl sulphide, carbon disulphide and sulphur dioxide. The main sulphur bearing constituents of this product gas, other than elemental sulphur, are hydrogen sulphide and the sulphur dioxide. And in the preferred form of the invention for producing the highest yield of sulphur, as indicated above, the sulphur containing compounds other than sulphur dioxide will be in the ratio of 2:1 to the sulphur dioxide.

In the second stage of the process the carbonyl sulphide and the carbon disulphide are reacted in the presence of a suitable catalyst with some of the sulphur dioxide in the product gases from the first stage. In order to achieve this reaction the product gases from the first step are cooled to about 390° C. and are then passed over a suitable catalyst as indicated above, including alumina.

The following reactions which go substantially to completion at this temperature in the presence of the catalyst take place.

(1) $2COS \text{ (gas)} + SO_2 \text{ (gas)} = 2CO_2 \text{ (gas)} + 3S \text{ (gas)}$
(2) $CS_2 \text{ (gas)} + SO_2 \text{ (gas)} = CO_2 \text{ (gas)} + 3S \text{ (gas)}$ A small portion of the hydrogen sulphide also reacts with some of the sulphur dioxide to produce elemental sulphur.

At this point in the process the gases may be and preferably are almost saturated with sulphur vapor and the sulphur is preferably removed at this point. This is done by cooling the gases to 125° C. or 120–130° C. which results in the condensation of the sulphur vapor. This may be done in any suitable sulphur condensing equipment and the molten liquid sulphur removed.

The reactions taking place during this second stage bring about a decrease in the concentration of sulphur dioxide and an increase in the concentration of hydrogen sulphide and sulphur.

In the second stage of the process, if carbon monoxide and hydrogen are present, they will react as indicated below with the sulphur dioxide to form additional sulphur.

$$2CO \text{ (gas)} + SO_2 \text{ (gas)} = 2CO_2 \text{ (gas)} + S \text{ (gas)}$$
$$2H \text{ (gas)} + SO_2 \text{ (gas)} = 2H_2O \text{ (gas)} + S \text{ (gas)}$$

Experimental evidence indicates that carbon monoxide and hydrogen are not always present at this stage of the process and that when they are present they do not react completely with the sulphur dioxide. On the other hand, any heavy hydrocarbons present, both saturated and unsaturated, will react to a considerable extent with some of the sulphur dioxide and will contribute significantly to increasing the sulphur yield.

After the removal of the sulphur, the remaining sulphur components in the gas are essentially hydrogen sulphide and sulphur dioxide, preferably in a mol ratio of 2:1.

The third stage of the process involves the reaction of the hydrogen sulphide and sulphur dioxide to produce elemental sulphur. This reaction is carried out in the presence of one of the catalysts indicated above, for instance, activated alumina, at temperatures between 200–275° C. The reaction is as follows:

$$2H_2S \text{ (gas)} + SO_2 \text{ (gas)} = 3S \text{ (gas)} + 2H_2O \text{ (gas)}$$

In order to provide the desired temperature the gases are re-heated after the condensation of the sulphur described above following the second stage.

After the final stage, the gases are again cooled to 125° C. or 120–130° C. to condense the gaseous sulphur.

In practicing this process it has been found that it is possible to tolerate a fairly high concentration of unreacted hydrocarbons while still producing the bright sulphur. We have found that in typical runs ahead of the second stage or carbonyl sulphide conversion assays of the product sulphur show 0.02% carbon and 2.2 color, whereas a typical "bright" sulphur may have 0.04% carbon and 3.0 color.

This compares favorably with sulphur produced generally from hydrogen sulphide derived from gaseous sources which show only a trace of carbon and color of 1.0 to 2.0.

The product after the carbonyl converter runs 0.00% carbon and 1.0 color.

The fact that this process can be carried out with stoichiometric quantities of hydrocarbon and sulphur dioxide for reducing all of the sulphur dioxide to elemental sulphur or that an excess of hydrocarbon may be employed without deleterious effect on the final product, is advantageous.

In carrying out the process the use of temperatures in the first stage or step which had heretofore been impossible is of material advantage not only for the reasons set forth above but because at the temperatures actually employed the catalyst stands up well and has a long useful life.

Generally in carrying out the invention it is desirable to free the gases from dust or suspended particles.

In carrying out the invention it is desirable and essential that the gases entering the catalyst at the initial stage or step be at a temperature sufficient to initiate and maintain the reaction.

The hydrocarbons employed may be natural gas, methane, ethane and propane. They also may be normally liquid hydrocarbons.

Reference to the drawings and particularly FIG. 1 will reveal suitable equipment arrangement and flow information for carrying out the invention.

In FIG. 1 the first phase reactors are indicated at R-1A and R-1B. The sulphur dioxide or sulphur dioxide containing gas is introduced through line 1. Suitable means may be provided for controlling the flow.

Depending upon the temperature of the incoming gas, the gas may flow either directly through line 2 toward the first stage reactors or it may flow through line 3 to a heat exchanger E-1A.

It will be understood that if it is necessary to heat the gas to bring it up to suitable temperature for initiating the reaction in the catalyst reactors, oxygen may be admitted along with hydrocarbon gas in order to generate the necessary heat. However, the heat may be readily available from the heat exchanger which is arranged to take heat from the gases after reaction in the first stage reactors.

A line 4 is provided for carrying the sulphur dioxide or sulphur dioxide containing gas to the stream after passing the first portion of the first stage reactor for reasons which will be explained later.

The sulphur dioxide passes through line 6 to line 10 where it enters the first stage reactor R-1A.

The hydrocarbon gas enters through line 8 and line 10 where it is admixed with the sulphur dioxide or sulphur dioxide containing gas.

The reactor R-1A contains one of the catalysts above mentioned and since the gases entering have been heated to at least 750° C. and preferably to 800° C. the above described reaction between the sulphur dioxide and the hydrocarbon by means of which the sulphur dioxide is reduced are instituted and moved toward completion.

Since the reaction is exothermic it may be that the use of a single reactor R-1A will not permit holding the temperature below 1000° C. Therefore, in the form of invention illustrated in FIG. 1 there is a second reactor R-1B. The product gas passing from reactor R-1A passes through line 7 where it may be enriched by further sulphur dioxide from line 4. The gases then pass through line 5 to line 12 where they may have additional hydrocarbon introduced from line 11. The mixture of gases then passes from line 12 to reactor R-1B where further catalyzed reaction takes place. The temperature is maintained below 1000° C. The reaction is thus completed and the catalyst protected.

The reaction gases from reactor R-1B pass through line 13 to heat exchanger E-1A where they are brought into heat exchange relationship, preferably indirect, with the entering sulphur dioxide or sulphur dioxide containing gases.

The gases leaving the first stage reactor section comprise sulphur, hydrogen sulphide, carbonyl sulphide, carbon disulphide and sulphur dioxide, and as pointed out above, when the process is carried out in the preferred manner the ratio of sulphur compounds other than sulphur dioxide to sulphur dioxide is about 2:1.

The gases then pass to the second stage. The reactor for this stage is indicated at R-1C. It contains catalyst just as do the other reactors.

Before passing to reactor R-1C the gas is cooled to about 390° C. This is accomplished in the heat exchanger E-1A and a second heat exchanger E-1B. The details of this heat exchanger mechanism are conventional and need not be described. Line 14 leads from heat exchanger E-1A to heat exchanger E-1B and line 15 leads therefrom to the second stage reactor R-1C.

In reactor R-1C the carbonyl sulphide and the carbon disulphide are interacted with part of the sulphur dioxide as pointed out above. Likewise, some of the sulphur dioxide and hydrogen sulphide react to produce elemental sulphur.

The gases leaving the reactor R-1C are substantially saturated with sulphur gas or vapor and are carried by line 16 to a condenser C-1A where the elemental sulphur is condensed and removed.

The details of this condenser are not shown since they are conventional.

The temperature is reduced to about 125° C. that is, between 120 and 130° C. Line 17 leads the product gases away from the condenser C-1A and line 18 leads the liquid sulphur off to suitable storage indicated as product sulphur in the diagram.

The remaining gases which consist mainly of hydrogen sulphide and sulphur dioxide in a 2:1 mol ratio pass to a heat exchanger E-1C through line 19. At this point the temperature is raised to from 200 to 275° C. and the gases pass through line 20 to a third stage reactor which is provided with catalyst as are the other two reactors. In this reactor the sulphur dioxide and hydrogen sulphide interact to produce elemental sulphur which is carried through line 21 to a condenser C-1B where the gases are cooled to about 125° C. that is, between 120 and 130° C. This condenser is conventional and the details are not given. The gases and condensed sulphur pass through line 22. The condensed sulphur passes through line 24 to storage and the residual gases are exhausted through line 23.

Figure 2:
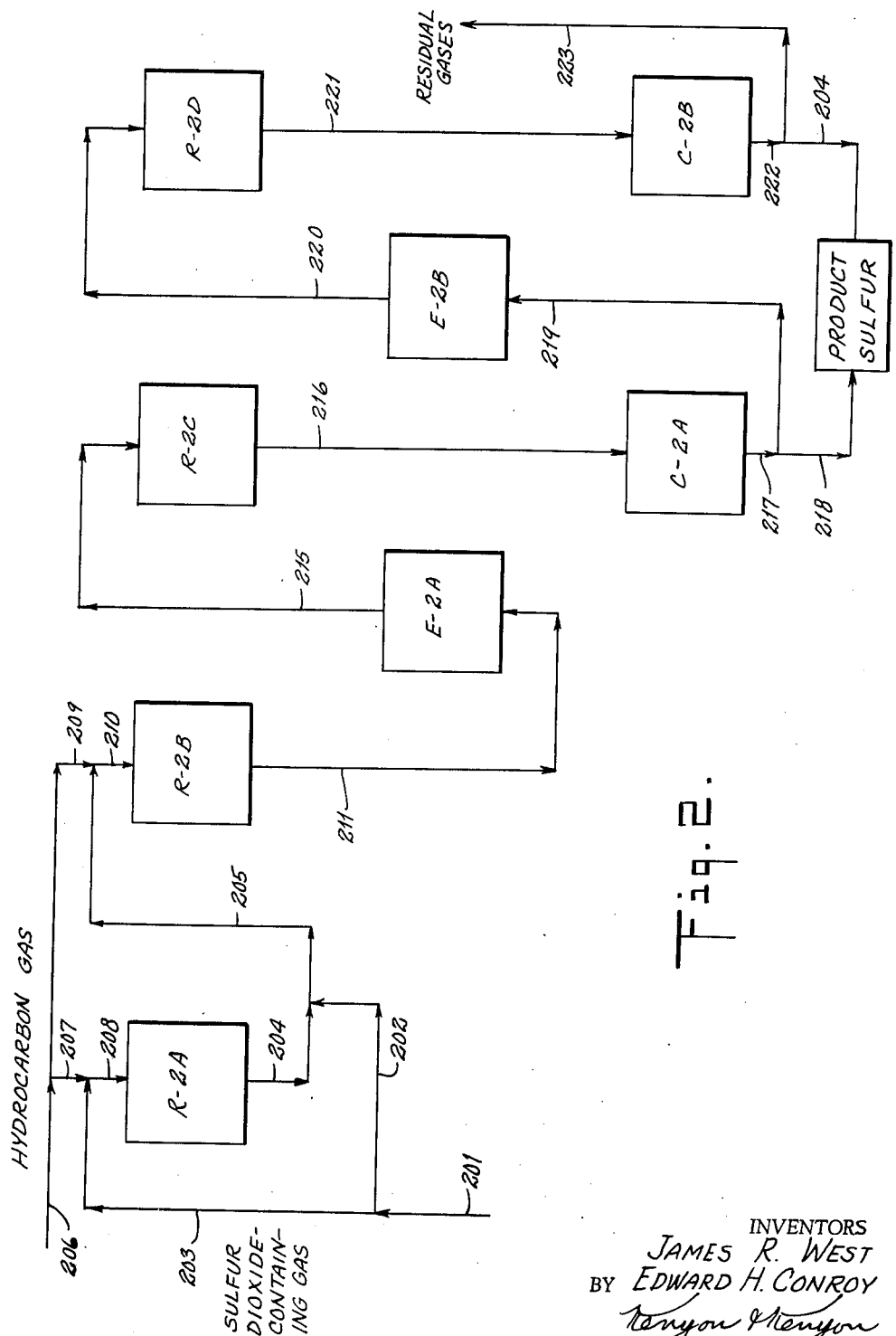
FIG. 2 shows diagrammatically another form of equipment for carrying out the invention.

In some cases the sulphur dioxide or sulphur dioxide containing gas may be available from prior processing at a temperature high enough to initiate and maintain the reaction with the hydrocarbon. Apparatus suitable for use in such cases is shown in FIG. 2 where the sulphur dioxide containing gas passes to the first stage reactor without pre-heating in a heat exchanger.

In this form of the invention the sulphur dioxide containing gas enters the system through a line 201. A bypass line 202 is provided while a line 203 conducts the sulphur dioxide containing gas to the first portion of the first stage reactor R-2A. The hydrocarbon gas in introduced through line 206 which feeds into line 207 which along with line 203 feeds into line 208 which goes to the reactor R-2A.

This reactor is identical in all material respects with the reactor R-1A of the form of invention shown in FIG. 1 and the reactions are the same. The temperatures are likewise maintained as described above. The reaction gas passes from the reactor R-2A through line 204 and line 205 to a second first stage reactor R-2B which is identical in all material respects with the reactor R-1B of the form of invention shown in FIG. 1. Sulphur dioxide containing gas from the bypass line 202 is added to the gases passing from the first primary reactor and hydrocarbon gas from line 206 passes through line 209 to line 210 where it joins the gases from line 205.

The reaction gases pass from the first stage reactors through line 211 to a heat exchanger E-2A. This corresponds to the heat exchanger E-1A in the form of invention shown in FIG. 1 except that the heat is not removed by incoming gases headed for the first stage reactor. In this heat exchanger the gases are cooled to a temperature of about 390° C. where the reactions which occur at the corresponding place in the form of invention shown in FIG. 1 occur.

The rest of the apparatus shown in FIG. 2 corresponds generally with that shown in FIG. 1. The reactor R-2C corresponds with the second stage reactor R–1C of FIG. 1 and the carbonyl sulphide and carbon disulphide react there to produce elemental sulphur just as in the reactor R–1C. The line 215 leading from the heat exchanger E–2A corresponds to the line 15 of FIG. 1. The line 216 leading from the reactor R–2C corresponds to the line 16 of FIG. 1. The condenser C–2A corresponds to the condenser C–1A. The lines 217, 218, 219, 220, 221, 222, 223 and 224 correspond to the lines 16 through 24 of the form of invention shown in FIG. 1 and the heat exchanger E–2B, the reactor R–2D and the condenser C–2B perform the same functions under the same conditions as the reactor R–1D and the condenser C–1B of FIG. 1 while the heat exchangers E–2B and E–1C correspond. The actual process steps are the same.

In the form of invention shown in FIG. 2 in the reactor R–2A oxygen may be employed to react with the methane to bring the heat up if necessary or desired.

Figure 3:
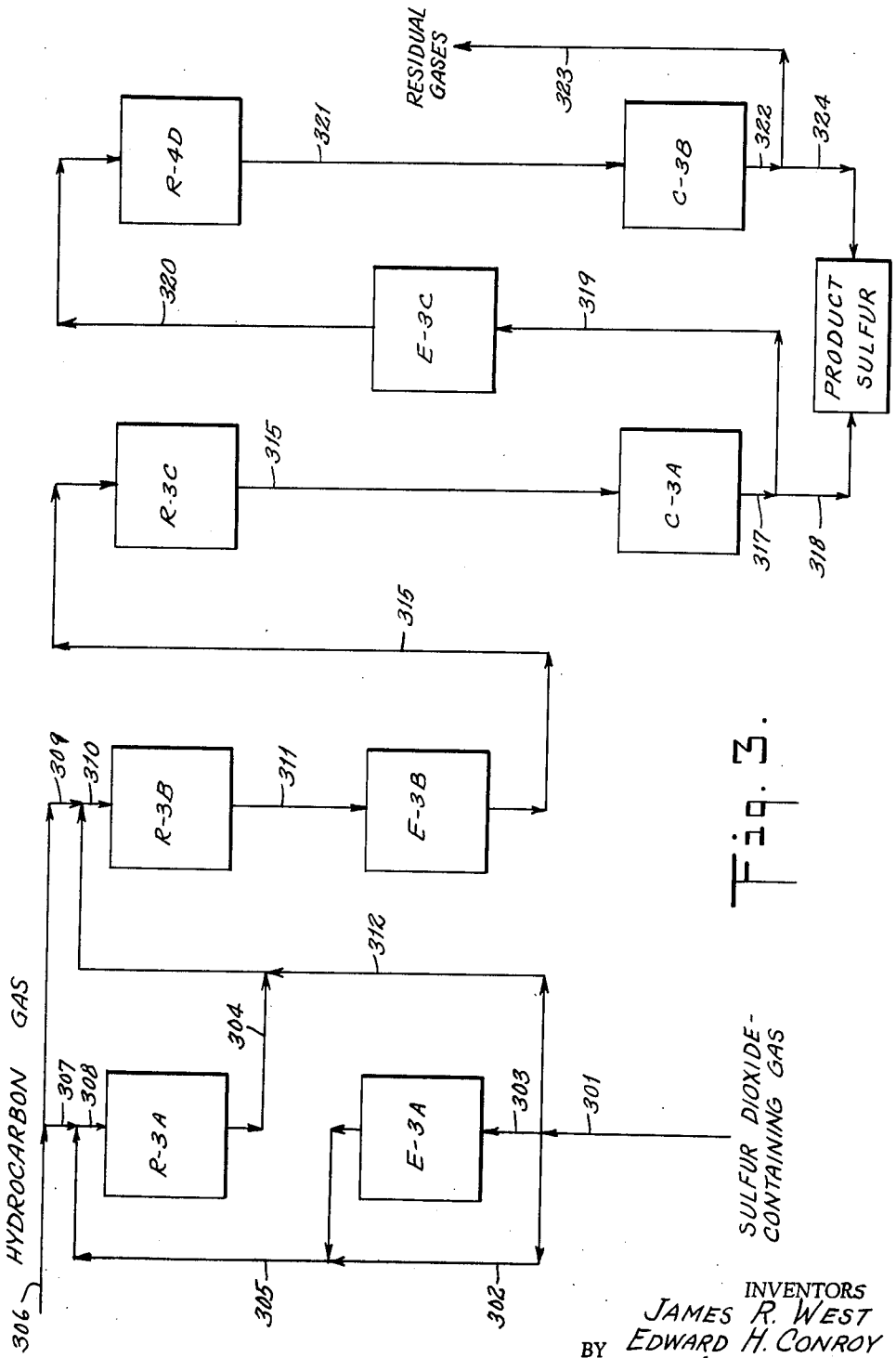
FIG. 3 shows diagrammatically a still different form of equipment for carrying out the invention.

Another form of the invention is illustrated in FIG. 3 for handling sulphur dioxide containing gas at or near ambient temperature. In this form of the invention a heat exchanger E–3A is employed where the temperature of the sulphur dioxide containing gas is raised to the desired temperature. The sulphur dioxide containing gas enters through line 301. Some of it may bypass the heat exchanger E–3A using line 302. Line 303 leads to the heat exchanger E–3A which may be of an indirect heating type fired with oil, gas or the like. The hot gas leaves the exchanger through line 305.

The hydrocarbon gas enters through line 306 and passes to one of the first stage reactors R–3A through lines 307 and 308, where it is joined by the heated gas from the line 305.

The reactor R–3A is similar to the reactor R–1A of FIG. 1 and the same reactions are brought about there in the presence of a catalyst and at the same temperatures.

The reaction gases pass through lines 304 and 310 to the second first stage reactor R–3B. There more hydrocarbon may be added through line 309 and more sulphur dioxide containing gas may be added from line 312.

The gases then pass through line 311 to heat exchanger E–3B where they are cooled to 390° C. They then pass through line 315 to the second stage reactor R–3C which corresponds to the reactor R–1C of FIG. 1.

The gases pass from reactor R–3C to condenser C–3A to heat exchanger E–3C, reactor R–4D and condenser C–3B, which correspond to the corresponding pieces of equipment R–1C, C–1A, E–1C, R–1D and C–1B of FIG. 1. Appropriate lines 315, 317, 318, 319, 320, 321, 322, 323 and 324 serve to carry the gases and product sulphur as will be clear from viewing FIG. 3 and in a manner corresponding to the operation of the apparatus shown in FIG. 1.

Figure 4:
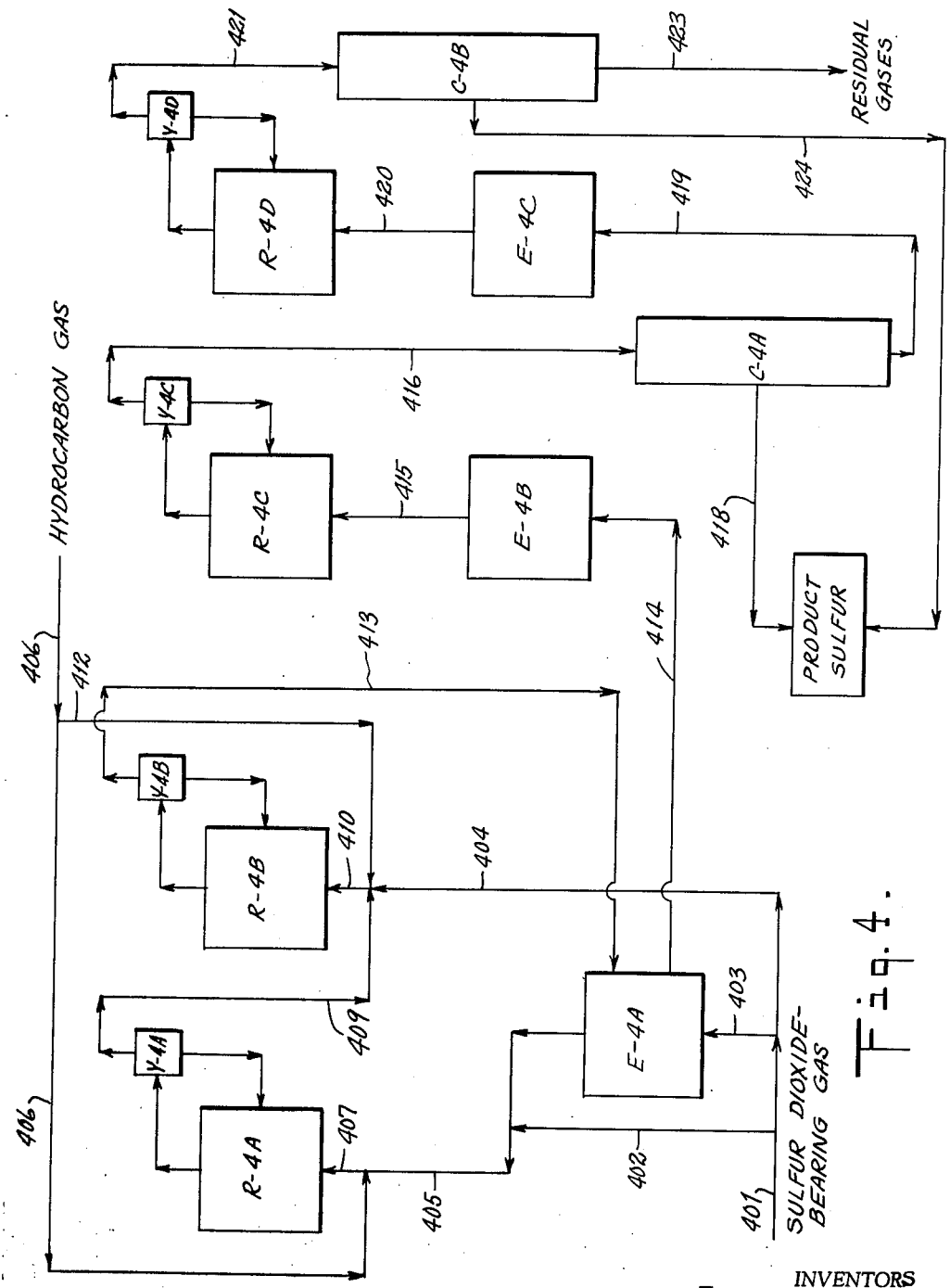
FIG. 4 is a diagrammatic representation of still another form of apparatus for carrying out the process.

Another way of performing the invention is illustrated in FIG. 4. In this form of the invention the various reactions are carried out in fluidized catalyst beds.

In this form of the invention the sulphur dioxide bearing gas enters through line 401. Some of it may bypass heat exchanger E–4A in line 402. Line 403 conducts such gas to the heat exchanger. The hot sulphur dioxide bearing gas is conducted through line 405 to the first of the first stage reactors R–4A.

The hydrocarbon is introduced through line 406 and joins the heated sulphur dioxide bearing gas in line 407 which leads to said first stage reactor.

In this form of the invention the reactor R–4A contains catalyst in a finely divided state so that the gases produce a fluidized bed of catalyst in a manner well known to the art.

Cataysts may be any of the catalysts above mentioned and the temperatures involved in this portion of the apparatus correspond to those in reactor R–1A of the form of invention shown in FIG. 1.

The gases pass from the fluidized catalyst reactor to a cyclone separator Y–4A where catalyst is removed and returned to the catalyst bed. The gases then pass through lines 409 and 410 to the second first stage reactor R–4B. This reactor is a fluidized catalyst bed type of reactor similar to R–4A and is provided with a cyclone separator Y–4B.

Sulphur dioxide bearing gases may be introduced through line 404 and additional hydrocarbon may be introduced through line 412.

The gases from the first stage reactors which correspond in all material respects with the gases from the first stage reactors of FIG. 1 pass through line 413 to the heat exchanger E–4A where, through indirect heat exchange, they heat the incoming sulphur dioxide bearing gases. These gases then pass through line 414 to a heat exchanger E–4B where they are reduced in temperature to about 390° C. They then pass through line 415 to the second stage reactor R–4C which corresponds in function to the reactor R–1C of FIG. 1. The reactor R–4C however is a fluidized catalyst type of reactor similar to the reactor R–4A. It is provided with a cyclone separator Y–4C. The gases pass from the second stage reactor through line 416 to a condenser C–4A corresponding to the condenser C–1A of FIG. 1. They pass then through a line 419 to a heat exchanger E–4C which corresponds to the heat exchanger E–1C of FIG. 1.

The condenser C–4A is run at about 125° C. or 120 to 130° C. to condense elemental sulphur which passes through line 418 to a suitable storage. In the heat exchanger E–4C the temperature is raised to from 200 to 275° C. and the gases then pass through line 420 to the third stage reactor R–4D which, like the reactor R–4A, is a fluidized catalyst reactor which is provided with a cyclone separator Y–4D. The gases then pass through line 421 to a condenser C–4B which corresponds to the condenser C–1B of FIG. 1. The residual gases pass out through line 423 while the condensed sulphur passes through line 424 to suitable storage.

Figure 5:
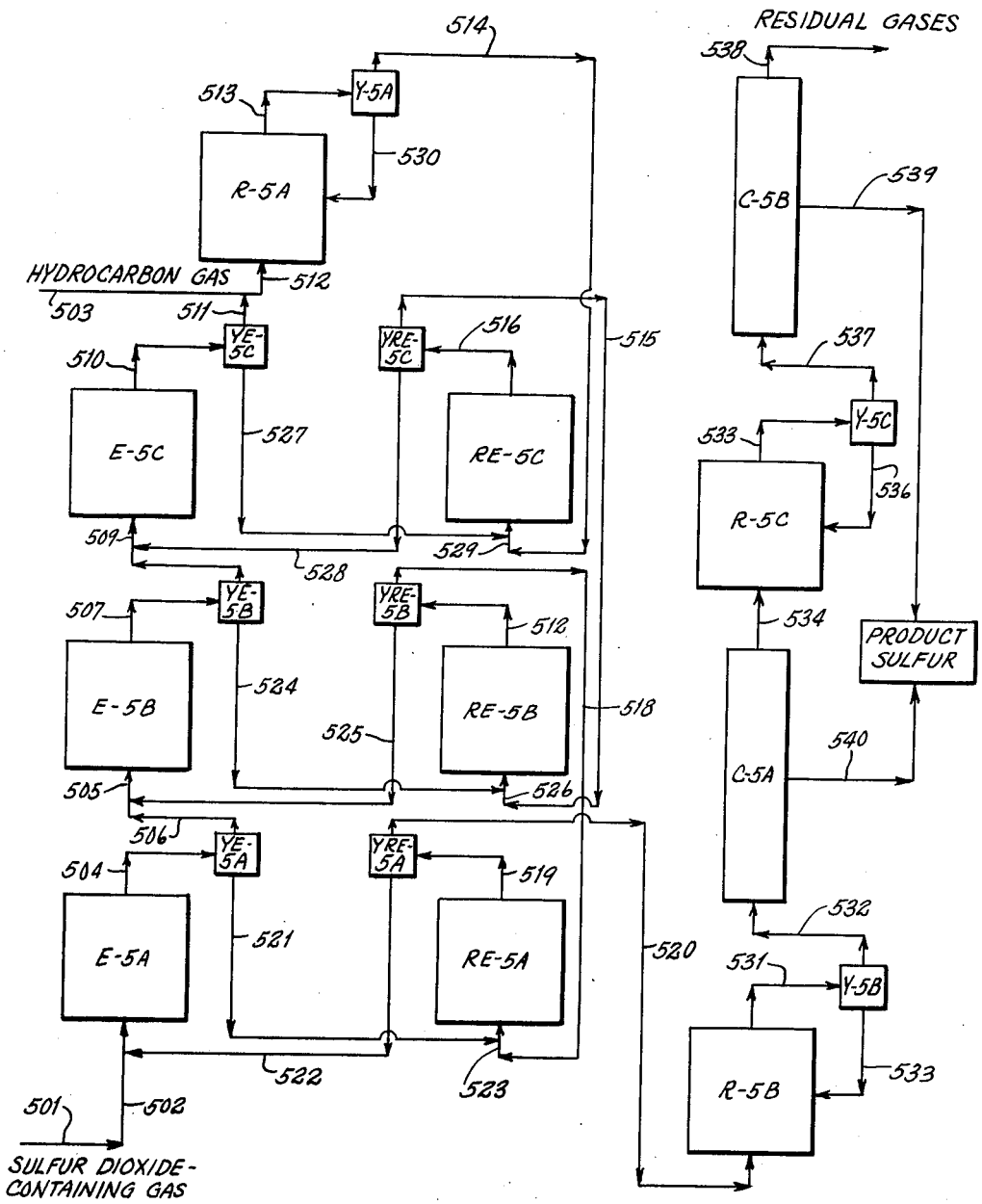
FIG. 5 shows diagrammatically a still different form of apparatus for carrying out the process.

In FIG. 5 there is shown schematically how the invention may be utilized in fluidized reactors and fluidized heat exchangers.

In this form of the invention the sulphur dioxide or sulphur dioxide containing gas enters through line 501. It flows through line 502 to the heat exchanger E–5A. On the way to the heat exchanger it picks up and entrains hot catalyst particles flowing through line 522 from the fluidized catalyst reactor RE–5A which will be described hereafter.

This creates a fluidized bed of catalyst in the heat exchanger E–5A. The hot catalyst particles there give up heat to the entering gas.

The heat exchanger is provided with a cyclone separator YE–5A which separates the cool catalyst particles from the heated entering gas for return to the reactor heat exchanger RE–5A through line 521.

The gases from the heat exchanger E–5A flow through line 504 to the cyclone separator and through line 505 and line 506 to a second heat exchanger E–5B.

The cyclone separator YE–5A is a conventional separator used for separating solids from gases. Other conventional means can be employed there.

In the line 506, the gas entrains heated catalyst particles coming from line 525.

These catalyst particles come from the fluidized catalyst reactor RE–5B.

A fluidized catalyst bed is produced in the heat exchanger E–5B and heat is transferred from the catalyst particles therein to the gas which passes out through line 507 to a cyclone separator YE–5B and through lines 508 and 509 to a third heat exchanger E–5C. On the way they entrain hot catalyst particles passing through line 528 from the reactor RE–5C.

The gases pick up additional heat here and pass through line 510 to a cyclone YE–5C similar to those heretofore described, which returns the particles through line 527 to reactor RE–5C.

The gases, which have now been heated to the necessary temperature for inducing and maintaining the reaction with hydrocarbon, flow through line 511 to join line 503 from whence the mixture of hydrocarbon and heated sulphur dioxide containing gas pass through line 512 to reactor R-5A. This reactor is a fluidized catalyst reactor with a bed of finely divided catalyst particles. The reaction between the hydrocarbon and the sulphur dioxide takes place here as in reactor R-1A above described.

The gases after reaction pass through line 513 to a cyclone Y-5A similar to the other cyclones which returns the catalyst particles through line 530 to reactor R-5A. The gases then pass through line 514 to reactor RE-5C, which is a fluidized catalyst reactor.

They entrain catalyst particles from line 527 as they pass through line 529.

As pointed out above, the reactor RE-5C and the heat exchanger E-5C with the associated cyclones form together a reactor heat exchanger of the fluidized catalyst type.

The gases leave the reactor R-5A at high, 800° to 1000° C., temperature and contain sulphur dioxide, carbon dioxide, carbonyl sulphide, carbon disulphide, hydrogen sulphide, sulphur vapor and water vapor.

If desired or necessary for temperature control, some of the natural gas or hydrocarbon gas may by-pass reactor 5-A and be introduced into line 514, with or without sulphur dioxide. Such modification of the system may be made in keeping with good engineering practice in order to improve the efficiency and economy and to control the temperature.

The mixture of catalyst and gas in reactor RE-5C creates a fluidized catalyst bed. Here additional catalyst surface is provided for additional reaction of sulphur dioxide and hydrocarbon. The heat recovery begins at this point since the heat is carried by the catalyst from reactor RE-5C to heat exchanger E-5C.

The gases flowing from reactor RE-5C flow through line 516 to cyclone separator YRE-5C. The separated solid particles pass from this cyclone separator through line 528 to the heat exchanger E-5C. The gases flow through line 515 to reactor RE-5B which is a fluidized catalyst reactor similar to RE-5C, where further reaction takes place.

This reactor RE-5B is provided with inlet 526 where the gas entrains particles of catalyst from line 524. It has an outlet 517, a cyclone separator YRE-5B which feeds into line 518 which leads to fluidized catalyst reactor RE-5A which has been referred to above. The gases pick up catalyst in line 523, from line 521. The reactor RE-5A is provided with outlet 519 and cyclone YRE-5A which is similar to the cyclones above discussed. The gas passes from this reactor through line 520.

Each of the reactors above described provides additional reaction time for the sulphur dioxide and the hydrocarbons.

In the fluidized beds of the reactors the gases are cooled and the solids are heated.

In FIG. 5 there are shown three heat exchanger reactors in combination. The actual number will depend upon engineering considerations.

In all of these reactors, the temperature is maintained high enough to maintain reaction. It may be possible to cool the gases down to the temperature necessary for the next stage of the reaction, namely, to 390° C.

As the gases flow through line 520, if necessary they may be cooled to bring them to 390° C. They are led into the reactor R-5B which is a fluidized catalyst reactor in which the carbonyl sulphide and carbon disulphide react with the sulphur dioxide as in reactor R-1B of FIG. 1.

The reactor R-5B is provided by a cyclone separator Y-5B. The gases pass out through line 531 and the catalyst particles are returned through line 533 to the reactor. The gases then pass through line 532 to a condenser C-5A where the temperature is reduced to about 120° C. or 120-130° C. to condense the sulphur. The condensed sulphur passes through the line 540 to storage and the gases pass through line 534 to reactor R-5C.

For the reaction in reactor R-5C the gases are reheated by conventional means not shown, to a temperature of from 200 to 275° C. The gases here are essentially hydrogen sulphide and sulphur dioxide and they react to produce elemental sulphur.

The reactor R-5C is provided with outlet 535 for the gases and a cyclone Y-5C which has a line 536 for returning the catalyst to the reactor. The gases pass from the cyclone through line 537 to condenser C-5B where sulphur is condensed at about 125° C. or 120-130° C. The condensed sulphur passes through line 539 to storage and the residual gases through line 538.

In all of the forms of the invention described here the hydrocarbon is supplied at least in stoichiometric quantities to react with the sulphur dioxide as pointed out above to produce elemental sulphur through the series of reactions described. However, if an excess is supplied it will not, in this process contaminate the elemental sulphur.

Figure 6:
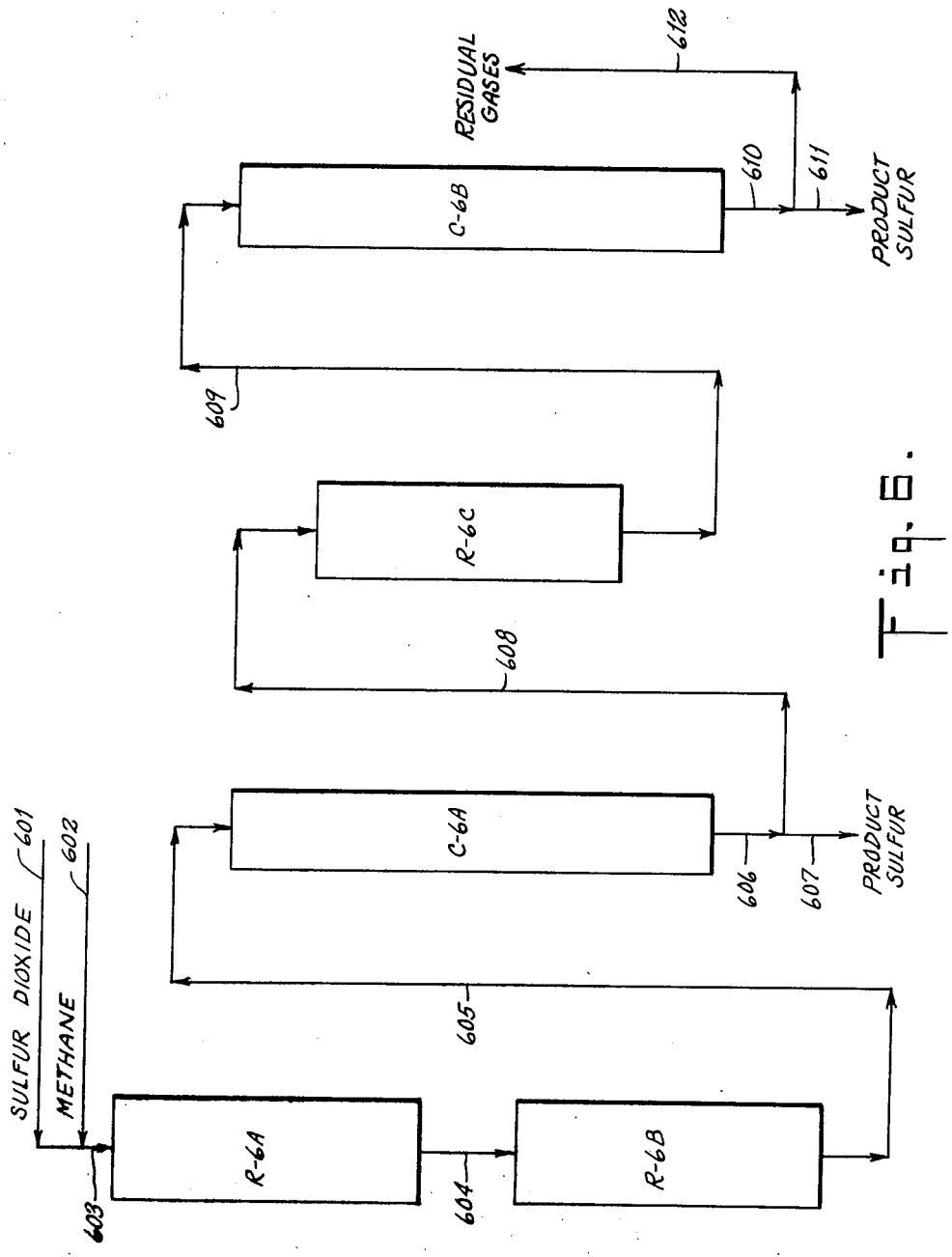
FIG. 6 is a diagrammatic showing of apparatus suitable for carrying on one stage of the process on a laboratory scale.

In FIG. 6 there is shown diagrammatically a laboratory size apparatus suitable for practicing steps constituting the invention.

The sulphur dioxide is introduced through line 601 and methane through line 602. The gases mix in line 603 and enter reactor R-6A.

This reactor is filled with 8 x 12 mesh granules of Harshaw A1-4 alumina catalyst. It is heated externally to a temperature of 764° C.

In carrying out the process the sulphur dioxide is introduced at a rate of 180.4 cc. of sulphur dioxide per minute measured at 0° C. and one atmosphere. The sulphur dioxide is 99.98% $SO_2$ free from moisture.

The methane is introduced at 90.4 cc. per minute measured at 0° C. and one atmosphere.

The gases pass through the catalyst at a space velocity of 1.58 cc. of feed gas per minute per cc. of catalyst, the gas volume being measured at 0° C. and one atmosphere.

In this reactor the sulphur dioxide and methane react to give carbon dioxide, carbonyl sulphide, carbon disulphide, hydrogen sulphide, sulphur vapor, water vapor, unreacted sulphur dioxide, and unreacted methane.

The hot gases flow through reactor R-6A, through a heated line 604 to reactor R-6B. This reactor is filled with 8 x 12 mesh granules of Harshaw A1-4 alumina catalyst.

It is heated externally by an electric furnace to 430° C.

The carbonyl sulphide and the carbon disulphide react with sulphur dioxide to yield sulphur vapor and carbon dioxide. Some hydrogen sulphide and sulphur dioxide also reacted.

The hot gases flow from this reactor through line 605 to a condenser C-6A which is maintained at 120-130° C. by electrical heating. The sulphur vapor condenses to molten sulphur which is drawn off through heated lines 606 and 607 to collection means which are not shown. The gases flow through line 606 to electrically heated lines 608 and thence to a reactor R-6C. This is filled with the same catalyst and is heated externally by an electric furnace to 252° C. Hydrogen sulphide and sulphur dioxide react here to form sulphur vapor and water vapor.

The gases flow from this reactor through line 609 which is heated electrically to condenser C-6B which is maintained at 120-130° C. by electrical heating. Sulphur is condensed here and taken off through lines 610 and 611 to suitable storage and the residual gases pass out through line 612.

Using this equipment at least 95% of the sulphur dioxide will be converted to sulphur in carrying out the process described and at least 99% of the methane will be reacted.

Another example of the process carried out in this equipment involves 173 cc. of sulphur dioxide per minute, measured at 0° C. and one atmosphere. The sulphur dioxide has a minimum purity of 99.98% and contains no moisture. Methane of 99.0% purity is metered into line 602 at the rate of 86.5 cc. per minute measured at 0° C. and one atmosphere. The mixed gases pass to reactor R–6A, which in this case is heated to 1025° C.

The mixed gases pass through catalyst R–6A at a velocity of 1.52 cc. of feed gas per minute per cc. of catalyst, the gas volume being measured at 0° C. and one atmosphere.

In this reactor the sulphur dioxide and methane reacted as above.

In this particular practice of the invention the reactor R–6B is heated by an electric furnace to 424° C. The reaction is the same as before.

In the reactor R–6A the temperature is 254° C. supplied by external heat from an electric furnace. The reaction is as indicated above.

In this particular practice of the invention, analysis shows that at least 96% of the sulphur dioxide is converted to sulphur and at least 99% of the methane is reacted.

Figure 7:
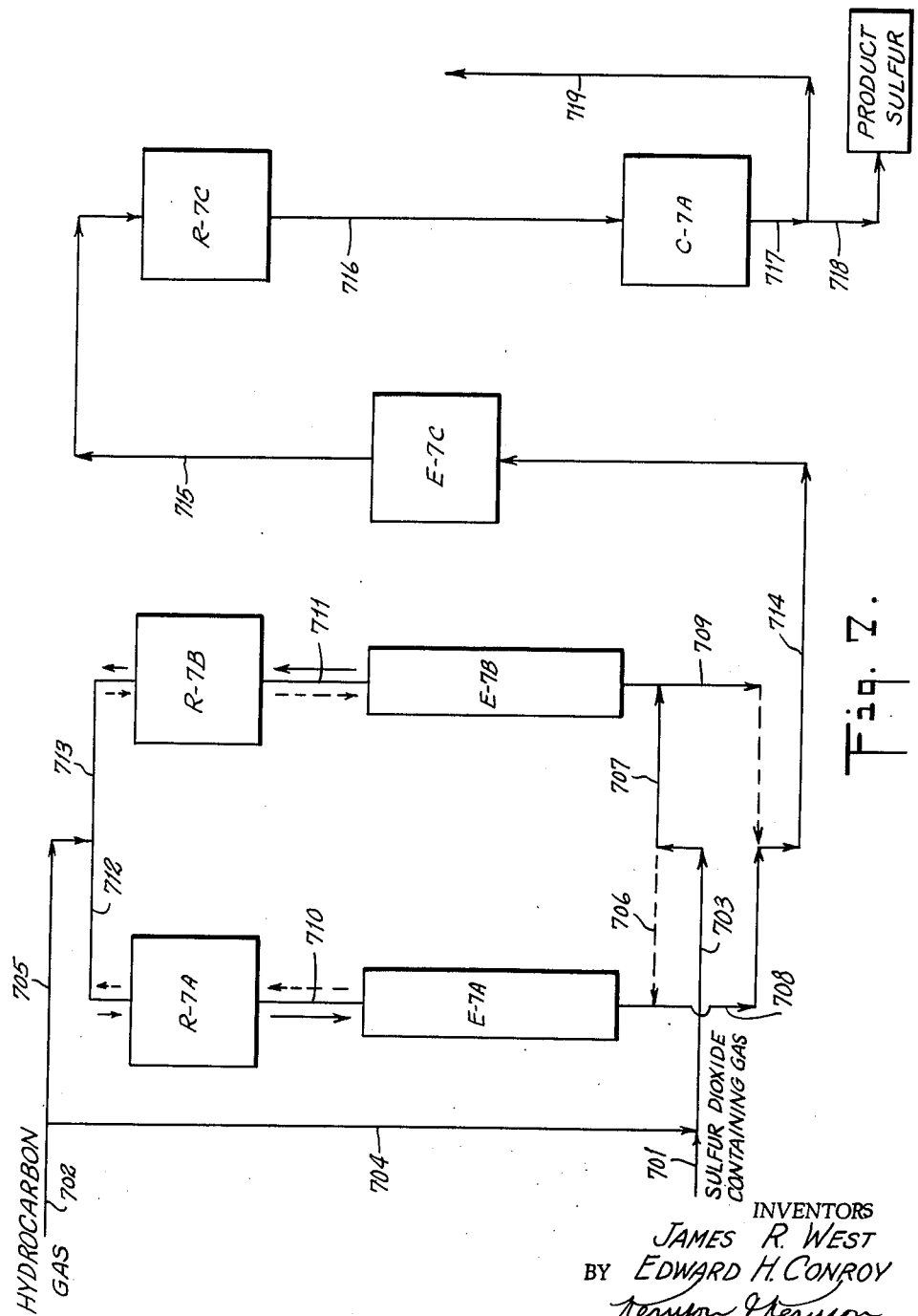
FIG. 7 is a diagrammatic illustration of another form of apparatus suitable for operations on a pilot plant scale.

In FIG. 7 is shown diagrammatically a pilot plane operation showing the practice of the invention. The sulphur dioxide, or sulphur dioxide-containing gas, enters through line 701 at a temperature of 90° C. Natural gas enters through line 702 at 25° C.

In this form of the invention, the sulphur dioxide-bearing gas has the following composition:

| | Percent |
|---|---|
| Sulphur dioxide | 10.3 |
| Oxygen | 3.3 |
| Nitrogen | 79.7 |
| Water vapor | 6.7 |

The natural gas has the following composition:

| | Percent |
|---|---|
| Methane | 93.07 |
| Ethane | 1.78 |
| Propane | 0.99 |
| n-Butane | 0.43 |
| i-Butane | 0.27 |
| n-Pentane | 0.02 |
| i-Pentane | 0.03 |
| Nitrogen | 3.41 |

In practicing the invention in this particular example, 2,580,000 cubic feet per day of sulphur dioxide-containing gas measured at 15.6° C. and one atmosphere flows into the system. This volume of gas contains sulphur dioxide equivalent to 9.97 long tons of sulphur. During the same 24-hour period 210,000 cubic feet of natural gas measured at the same condition as the sulphur dioxide-containing gas, enters the system. This amount represents about 20% excess over that required for the following reactions:

$$CH_4 + 2SO_2 = CO_2 + 2H_2O + 2S$$

and

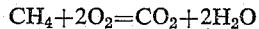

$$CH_4 + 2O_2 = CO_2 + 2H_2O$$

In this form of the invention sulphur dioxide containing gas flows from line 701 to line 703. About 14% of the natural gas flows from line 702 into line 704 from where it passes into line 703, mixing with the sulphur dioxide-containing gas.

From line 703 mixed gases may enter either line 706 or 707 depending upon the position of a valve controlled on a time cycle and controlling these lines, but not shown.

During one part of the cycle mixed gases flow through line 707 into regenerative type heat exchanger E–7B. In their passage through this heat exchanger the gases are raised in temperature to about 760–816° C. by heat transfer from the tile mass or from refractory brickwork, depending upon the type of regenerative equipment used.

In the particular form of apparatus shown a Hasche regenerator may be employed, although other heat exchangers of a similar nature could be used. In some cases catalyst beds, under some conditions, could be used as regenerative-type heat exchangers. Pebble heaters and molten salt baths may also be used.

From heat exchanger E–7B the hot gas stream flows through line 711 into reactor R–7B. This reactor contains a fixed bed of alumina catalyst two feet deep, in which the temperature of the gases may increase to 899° C., as a result of the reaction on the catalyst and the regenerative heat transfer by the catalyst.

Temperature control may be effected by by-passing some of the sulphur dioxide-containing gas around the heat exchanger by means not shown. Product gases leave reactor R–7B during this portion of the cycle via line 713. To these gases is added 86% of the natural gas through line 705. The natural gas and the product gas mix as they flow through line 712 to reactor R–7A which has a fixed bed of alumina catalyst two feet deep like that in reactor R–7B.

The temperature here may be raised to 982° C. The product gases of the reactors contain carbon dioxide, carbonyl sulphide, carbon disulphide, hydrogen sulphide, sulphur dioxide, nitrogen, sulphur vapor, water vapor and hydrocarbon gas. These gases flow through line 710 into a regenerative-type heat.

The hot gases raise the temperature of the tile mass in passage through exchanger E–7A and leave the exchanger through line 708 at a temperature of 704° C. or less.

The gases pass from line 708 to line 714 and thence to heat exchanger E–7C. Due to heat losses these gases may enter this heat exchanger at about 550° C.

On the other half of the cycle the mixture of natural gas and sulphur dioxide-containing gas flows into line 706 instead of line 707. The mixture passes into the regenerative-type heat exchanger E–7A where it is heated to 760–816° C. The heated gases then flow through line 710 to reactor R–7A. Just as in the other half cycle in reactor R–7B the gases react and the temperature becomes 899° C. Some of the sulphur dioxide-containing gas may be by-passed around exchanger E–7A as indicated above for the other half of the cycle. The product gases pass from reactor R–7A through line 712 and 86% of the natural gas is added through line 705. The natural gas and product gases mix and flow through line 713 into reactor R–7B where they react to raise the temperature to 982° C. by the heat of reaction. The product gases are the same as in the other half of the cycle in reactor R–7A. They pass through line 711 into the regenerative-type heat exchanger E–7B heating up the tile mass and leaving through line 709 at 704° C. They then pass to line 714.

It will be appreciated that with this arrangement heat is recovered through reversing the cycle for equal time periods.

The gases passing from heat exchanger E–7C are cooled to 390° C. They flow through line 715 to reactor R–7C.

This reactor contains a fixed bed three feet deep of alumina catalyst and the carbonyl sulphide and carbon disulphide react here with sulphur dioxide as indicated above.

The gases pass from reactor R–7C through line 716 at 430° C. They pass to condenser C–7A where they are cooled to 130° C. to condense elemental sulphur. This sulphur passes through lines 717 and 718 to storage. The gases pass through line 717 and 719 to a further catalyst chamber similar to that described in the other forms of the invention for converting the hydrogen sulphide to sulphur. In good operation the mol ratio of hydrogen sulphide to sulphur dioxide at this point will be 2:1.

In this form of the invention 56% of the sulphur is recovered as elemental sulphur. The gases still contain, as hydrogen sulphide and sulphur dioxide, about 44% of the sulphur equivalent in the feed gas. By the processes indicated above these gases will react to bring the total yield to about 93%.

In FIG. 8, which is generally similar to the other figures, the sulphur dioxide-containing gas enters through line 801. Some passes through line 802 to line 806. Part of it passes through line 803 to indirect heat exchanger E-8A.

Part of the hydrocarbon gas which enters through line 808, passes through line 809 and joins the sulphur dioxide bearing gas on the way to the heat exchanger E-8A and flows from it through line 806 to the first stage reactor R-8A. Here the reaction is similar to that of reactor R-1A of FIG. 1. The reacted gases pass through line 807 and are joined by sulphur dioxide-containing gas from line 804. The mixed gases from these two lines pass through line 805 to a second first stage reactor R-8B. Some of the hydrocarbon gas from line 810 joins the gases being introduced through line 811. The gases from the first stage reaction pass through line 812 through the heat exchanger E-8A to heat up incoming gases and to be cooled. They then pass through line 813 to heat exchanger E-8B. They then pass through line 814 to the carbonyl sulphide reactor R-8C. The gases then pass through line 815 to condenser C-8A. Condensed sulphur passes through lines 816 and 817 to storage while the gases pass through line 818 to heat exchanger E-8C. The gases then pass through line 819 to reactor R-8D where the hydrogen and sulphur dioxide react. The product gas is then passed through line 820 to condenser C-8B. The condensed product sulphur passes through line 821 and 823 to storage and residual gases pass out through line 822.

The temperatures in the various lines illustrated in FIG. 8 are indicated in the following tables:

| Stream | Temperature | |
|---|---|---|
| | (F) | (C) |
| 801 | 104 | 40 |
| 804 | 104 | 40 |
| 806 | 1,520 | 827 |
| 807 | 1,993 | 1,089 |
| 808 | 77 | 25 |
| 811 | 1,520 | 827 |
| 812 | 1,993 | 1,089 |
| 813 | 1,124 | 607 |
| 814 | 734 | 390 |
| 815 | 800 | 427 |
| 818 | 260 | 127 |
| 819 | 500 | 260 |
| 820 | 530 | 271 |
| 822 | 260 | 127 |

The flow rates in the gas streams are shown in the following table:

[Flow Rate, M cu. ft. per day]

| Stream Component | Stream 801 | Stream 803 | Stream 804 | Stream 805 | Stream 806 | Stream 807 | Stream 808 | Stream 809 | Stream 810 |
|---|---|---|---|---|---|---|---|---|---|
| $CH_4$ | 0 | 359.5 | 0 | 0 | 359.5 | 0 | 750 | 359.5 | 390.5 |
| $CO_2$ | 0 | 0 | 0 | 359.5 | 0 | 359.5 | 0 | 0 | 0 |
| $COS$ | 0 | 0 | 0 | 0 | 0 | 0 | 0 | 0 | 0 |
| $H_2O$ | 108 | 93 | 15 | 827 | 93 | 812 | 0 | 0 | 0 |
| $H_2S$ | 0 | 0 | 0 | 0 | 0 | 0 | 0 | 0 | 0 |
| $SO_2$ | 1,500 | 1,290 | 210 | 781 | 1,290 | 571 | 0 | 0 | 0 |
| $S^1$ | 0 | 0 | 0 | 359.5 | 0 | 359.5 | 0 | 0 | 0 |
| Total | 1,608 | 1,742.5 | 225 | 2,327 | 1,742.5 | 2,102 | 750 | 359.5 | 390.5 |

| Stream Component | Stream 811 | Stream 812 | Stream 813 | Stream 814 | Stream 815 | Stream 818 | Stream 819 | Stream 820 | Stream 822 |
|---|---|---|---|---|---|---|---|---|---|
| $CH_4$ | 390.5 | 0 | 0 | 0 | 0 | 0 | 0 | 0 | 0 |
| $CO_2$ | 359.5 | 660 | 660 | 660 | 750 | 750 | 750 | 750 | 750 |
| $COS$ | 0 | 90 | 90 | 90 | 0 | 0 | 0 | 0 | 0 |
| $H_2O$ | 827 | 1,242 | 1,242 | 1,242 | 1,228 | 1,228 | 1,228 | 1,520.4 | 1,520.4 |
| $H_2S$ | 0 | 366 | 366 | 366 | 380 | 380 | 380 | 87.6 | 87.6 |
| $SO_2$ | 781 | 228 | 228 | 228 | 190 | 190 | 190 | 43.8 | 43.8 |
| $S^1$ | 359.5 | 408 | 408 | 408 | 465 | 1.5 | 1.5 | 220.8 | 1.4 |
| Total | 2,717.5 | 2,994 | 2,994 | 2,994 | 3,013 | 2,549.5 | 2,549.5 | 2,622.6 | 2,403.2 |

[1] As $S_2$ vapor.

These tables are based upon conditions which should exist when pure or concentrated sulphur dioxide at 40° C. saturated with water vapor, and methane at 25° C. are reacted in the type plant illustrated in FIG. 8.

In Table I the volumes are measured at 15.6° C. and one atmosphere.

The equivalent sulphur in the feed is 126,420 pounds per day. From condenser C-1A, 78,130 pounds per day of sulphur is collected and from condenser C-1B, 36,980 pounds per day is collected for a total recovery of 115,110 pounds per day or 91% of the total sulphur.

The invention has been described above in various forms by way of illustration. It will be appreciated that it may be practiced in other forms differing in detail from those described above, it being understood that the examples given are merely by way of illustration and not by way of limitation.

We claim:

1. The process of reducing sulphur dioxide to sulphur comprising reacting sulphur dioxide with a gaseous hydrocarbon in the presence of a catalyst selected from the group consisting of activated alumina, bauxite, calcium sulphide and quartz to produce elemental sulphur and a gaseous mixture comprising hydrogen sulphide, carbonyl sulphide, carbon disulphide and sulphur dioxide with a mol ratio of sulphur compounds other than sulphur dioxide to sulphur dioxide of about 2:1 and during said reaction maintaining the temperature below 1000° C., cooling said gases to about 390° C. and contacting them with a catalyst to thereby react the carbonyl sulphide and carbon disulphide with sulphur dioxide to produce additional sulphur, thereafter cooling to about 125° C. to condense the free sulphur and separating the same to leave hydrogen sulphide and sulphide dioxide in approximately a 2:1 mol ratio, thereafter heating the remaining gas in the presence of a catalyst to from 200 to 275° C. to react the remaining hydrogen sulphide and sulphur dioxide and thereafter cooling to about 125° C. to condense the sulphur and separating the same.

2. The process of reducing sulphur dioxide to sulphur comprising reacting sulphur dioxide with a gaseous hydrocarbon in the presence of a catalyst to produce elemental sulphur and a gaseous mixture comprising hydrogen sulphide, carbonyl sulphide, carbon disulphide and sulphur dioxide with a mol ratio of sulphur compounds other than sulphur dioxide to sulphur dioxide of about 2:1 and during said reaction maintaining the temperature below 1000° C., cooling said gases to about 390° C. and contacting them with a catalyst to thereby react the carbonyl sulphide and carbon disulphide wtih sulphur dioxide to produce additional sulphur, thereafter cooling to about 125° C. to condense the free sulphur and separating the same to leave hydrogen sulphide and sulphur dioxide in approximately a 2:1 mol ratio, thereafter heating the remaining gas in the presence of a catalyst to from 200 to 275° C. to react the remaining hydrogen sulphide and sulphur dioxide and thereafter cooling to about 125° C. to condense the sulphur and separating the same.

3. The process of reducing sulphur dioxide to sulphur comprising reacting sulphur dioxide with a gaseous hydrocarbon in the presence of a catalyst selected from the group consisting of activated alumina, bauxite, calcium sulphide and quartz to produce elemental sulphur and a gaseous mixture comprising hydrogen sulphide, carbonyl sulphide, carbon disulphide and sulphur dioxide and during said reaction maintaining the temperature below 1000° C. cooling said gases to about 390° C. and contacting them with a catalyst to thereby react the carbonyl sulphide and carbon disulphide with sulphur dioxide to produce additional sulphur, thereafter cooling to about 125° C. to condense the free sulphur and separating the same to leave hydrogen sulphide and sulphur dioxide in approximately a 2:1 mol ratio, thereafter heating the remaining gas in the presence of a catalyst to from 200 to 275° C. to react the remaining hydrogen sulphide and sulphur dioxide and thereafter cooling to about 125° C. to condense the sulphur and separating the same.

4. The process of reducing sulphur dioxide to sulphur comprising reacting sulphur dioxide with a gaseous hydrocarbon in the presence of a catalyst to produce elemental sulphur and a gaseous mixture comprising hydrogen sulphide, carbonyl sulphide, carbon disulphide and sulphur dioxide and during said reaction maintaining the temperature below 1000° C., cooling said gases to about 390° C. and contacting them with a catalyst to thereby react the carbonyl sulphide and carbon disulphide with sulphur dioxide to produce additional surphur, thereafter cooling to about 125° C. to condense the free sulphur and separating the same to leave hydrogen sulphide and sulphur dioxide in approximately a 2:1 mol ratio, thereafter heating the remaining gas in the presence of a catalyst to from 200 to 275° C. to react the remaining hydrogen sulphide and sulphur dioxide and thereafter cooling to about 125° C. to condense the sulphur and separating the same.

5. The process of reducing sulphur dioxide to sulphur comprising reacting sulphur dioxide with a hydrocarbon in the presence of a catalyst to produce a gaseous mixture comprising sulphur, hydrogen sulphide, carbonyl sulphide, carbon disulphide and sulphur dioxide and during said reaction maintaining the temperature below 1000° C., cooling said gases to about 390° C. and contacting them with a catalyst to thereby react the carbonyl sulphide and carbon disulphide with sulphur dioxide to produce additional sulphur, thereafter cooling to about 125° C. to condense the free sulphur and separating the same to leave hydrogen sulphide and sulphur thereafter heating the remaining gas in the presence of a catalyst to from 200° to 275° C. to react the remaining hydrogen sulphide and sulphur dioxide and thereafter cooling to about 125° C. to condense the sulphur and separating the same.

6. The process of reducing sulphur dioxide to sulphur comprising reacting sulphur dioxide with a hydrocarbon in the presence of a catalyst to produce a gaseous mixture comprising sulphur, hydrogen sulphide, carbonyl sulphide, carbon disulphide and sulphur dioxide and during said reaction maintaining the temperature at from 800°–1000° C., cooling said gases to about 390° C. and contacting them with a catalyst to thereby react the carbonyl sulphide and carbon disulphide with sulphur dioxide to produce additional sulphur, thereafter cooling to about 125° C. to condense the free sulphur and separating the same to leave hydrogen sulphide and sulphur thereafter heating the remaining gas in the presence of a catalyst to from 200° to 275° C. to react the remaining hydrogen sulphide and sulphur dioxide and thereafter cooling to about 125° C. to condense the sulphur and separating the same.

References Cited by the Examiner

UNITED STATES PATENTS

| | | | |
|---|---|---|---|
| 1,359,114 | 11/20 | Shiomi | 23—226 |
| 1,741,551 | 12/29 | Benner et al. | 23—226 |
| 1,904,483 | 4/33 | Lenander | 23—226 |
| 1,917,685 | 7/33 | Bacon et al. | 23—226 |
| 1,917,687 | 7/33 | Bacon et al. | 23—226 |
| 1,967,263 | 7/34 | Rosenstein | 23—226 |
| 1,967,264 | 7/34 | Rosenstein | 23—226 |

FOREIGN PATENTS 6,404   1885   Great Britain.

MAURICE A. BRINDISI, *Primary Examiner.*

UNITED STATES PATENT OFFICE
CERTIFICATE OF CORRECTION

Patent No. 3,199,955                                August 10, 1965

James R. West et al.

It is hereby certified that error appears in the above numbered patent requiring correction and that the said Letters Patent should read as corrected below.

Column 6, line 49, and column 7, line 61, for "in", each occurrence, read -- is --; column 7, line 70, for "Catayst" read -- Catalyst --; column 9, line 71, for "R-58" read -- R-5B --; column 11, line 4, for "1025° C." read -- 1024° C. --; line 21, for "plane" read -- plant --; line 24, for "90° C." read -- 93° C. --; column 14, line 59, for "sulphide", second occurrence, read -- sulphur --; column 15, line 38, for "surphur" read -- sulphur --.

Signed and sealed this 8th day of February 1966.

(SEAL)
Attest:

ERNEST W. SWIDER                          EDWARD J. BRENNER
Attesting Officer                            Commissioner of Patents